Feb. 24, 1931.　　　G. H. ENDERBY　　　1,793,470
BRAKE AND CLUTCH GEAR
Filed Sept. 22, 1927　　2 Sheets-Sheet 1
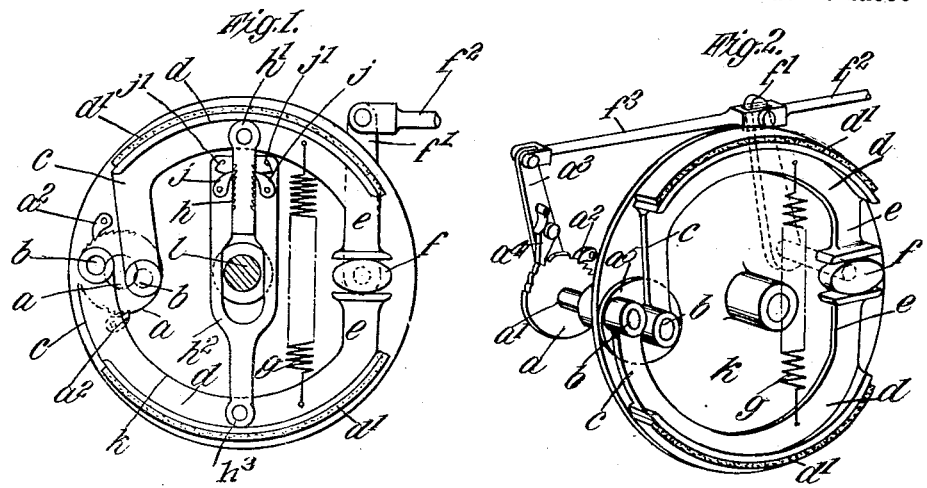
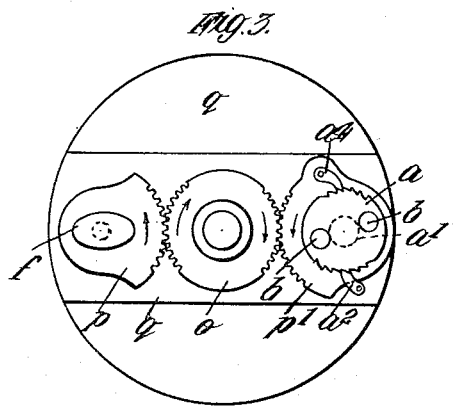
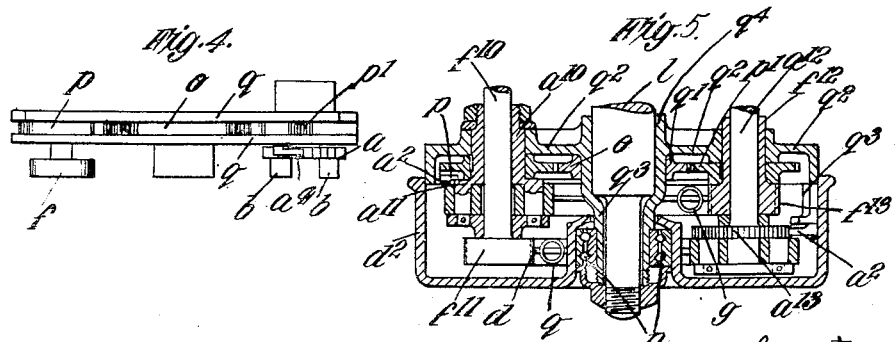

Feb. 24, 1931. G. H. ENDERBY 1,793,470
BRAKE AND CLUTCH GEAR
Filed Sept. 22, 1927 2 Sheets-Sheet 2
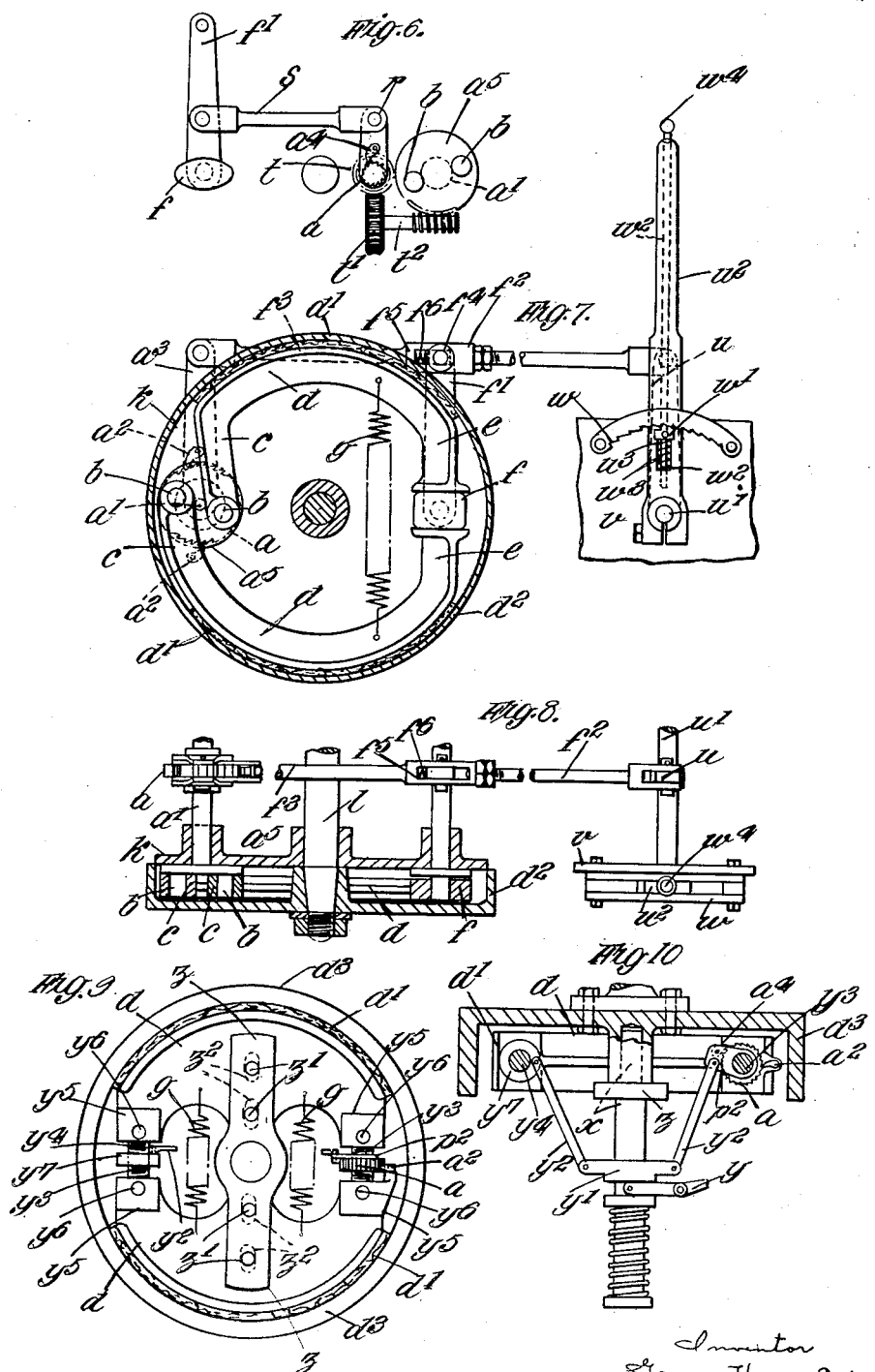

Patented Feb. 24, 1931

1,793,470

UNITED STATES PATENT OFFICE

GEORGE HENRY ENDERBY, OF NEWLYN-WEST, PENZANCE, ENGLAND

BRAKE AND CLUTCH GEAR

Application filed September 22, 1927, Serial No. 221,184, and in Great Britain December 23, 1926.

This invention relates to operating and adjusting gear of motor car and similar brakes and clutches of the kind comprising a pair of shoes or a band operated through the medium of a cam or similar device for engaging or gripping the inner or outer surface of a brake or clutch drum or its equivalent for arresting the movement or reducing the speed of the vehicle, imparting or transmitting rotary motion to or from the drum, or for a similar purpose.

The primary object of the present invention is to provide improvements in brake and clutch operating and adjusting gears of the character mentioned whereby they are evenly and equally adjusted as the parts which are moved into and out of engagement with each other become worn, the invention being especially applicable in connection with brakes of two or more of the wheels of the vehicle for maintaining them in such a condition that all the brakes with which the wheels of the vehicle are fitted may be applied with equal effect upon the operation of the hand or foot brake lever. The invention is also applicable to driving clutches for ensuring engagement of the parts for transmitting motion.

According to the invention, the adjusting gear is operated through the brake or clutch operating gear during the actuation thereof. The adjustment of the gear may be effected automatically by so constructing the gear that any predetermined additional movement of any one or more of the brake or clutch shoes or the equivalent thereof (hereinafter referred to as "brake shoes" is taken up during the operation of the gear either when the shoes are moved to the engaging position or vice versa. Such an arrangement is particularly serviceable in connection with a series of brakes of a vehicle, so as to ensure the simultaneous engagement of all the brake blocks with the brake drums during the operation of the hand or foot operated brake lever the additional movement being permanently taken up during such operation, so that at the next operation of the gear for applying the brakes or engaging the clutch all of the brake or clutch shoes will come into operative position evenly and simultaneously without additional relative movement occuring between the parts of the gear connected with one or more of the brake or clutch shoes in relation to the other brake shoes, unless it so happens that the previous braking has been excessive and one or more blocks of the brake or clutch shoes has or have become worn to a greater extent than the others, whereupon additional relative movement will again take place between the parts of the gear connected with the shoes of the excessively worn blocks as compared with the parts of the gear connected with the other blocks. The adjusting gear may comprise parts connected or capable of co-acting with the brake or clutch shoes and may be adapted to be directly operated by the brake or clutch lever or parts connected therewith or through gearing operated thereby. Preferably, the adjusting gear is in the form of a take-up motion device, such as a pawl and ratchet or the equivalent thereof.

In order that the said invention may be clearly understood and readily carried into effect, the same will now be more fully described by way of example with reference to the accompanying drawings in which:—

Figure 1 is a side view of one arrangement of the brake shoes and adjusting gear of a vehicle brake made in accordance with the invention.

Figure 2 is a perspective view of another arrangement.

Figures 3 and 4 are respectively a side elevation and plan of a further alternative construction of the adjusting gear wherein the parts are geared together.

Figure 5 is a sectional plan illustrating a double brake or a combination of the adjusting gears shown in Figures 2, 3 and 4.

Figure 6 is a side view of a modification of the geared form of the adjusting gear.

Figures 7 and 8 are respectively a side elevation and plan with the brake drum and parts therein shown in section illustrating the general arrangement of the adjusting and brake operating gear.

Figures 9 and 10 are respectively front elevation and sectional plan illustrating the application of the invention to a driving clutch.

The adjusting gear shown in Figure 1 comprises a ratchet disc $a$ mounted on a spindle $a^1$ and fitted with eccentrically disposed pins $b$ on which the arms $c$ at one end of the brake shoes $d$ are mounted, the opposite ends of the shoes being provided with flanged extensions $e$ capable of engaging the cam $f$ which serves to move the shoes $d$ in opposition to a spring $g$ extending between and connecting the shoes together near the ends engaging the cam. Upon the actuation of the cam $f$ through the lever $f^1$ and link $f^2$ forming part of the brake operating gear the brake shoes $d$ are moved outwardly in opposite directions about the pins $b$. In such movement a ratchet rod $h$ pivotally connected at $h^1$ to one of the shoes $d$ is moved between the arms of and relatively to a bifurcated rod $h^2$ which is pivotally attached to the other brake shoe at $h^3$ and is fitted with pawls $j$ controlled by springs $j^1$. Should the movement of the ratchet rod $h$ be greater than the length of one or more of the ratchet teeth due to the wear of the brake blocks $d^1$, the pawls $j$ will become engaged with succeeding ratchet teeth and the travel of the ratchet rod relatively to the bifurcated rod will be accordingly maintained. If the relative movement of the ratchet rod and the bifurcated rod be less than the pitch of one of the teeth, the parts will return to their initial positions upon the release of the brakes. Where the ratchet rod $h$ has been moved outwardly and the pawls $j$ have been engaged with other ratchet teeth then upon the return of the cam $f$ to its initial position the spring $g$ will move the brake shoes $d$ about their respective pivotal connections $h^1$ and $h^3$ with the rods $h$ and $h^2$ and the ratchet disc $a$ will be partially rotated through the connection of the brake shoes with the pins $b$ and advanced relatively to the pawls $a^2$ which will serve to retain the ratchet disc $a$ in its advanced position. It will be understood that when the brake shoes are moved outwardly about the pins $b$ to the braking position, the ends of the shoes furthest away from the pins $b$ will be moved a greater distance outwardly than the ends of the shoes nearest to the pins $b$, and consequently the ends furtherest away from the pins $b$ will be the primary braking parts. Upon the return movement of the cam $f$ to its initial position the spring $g$ moves such primary braking parts inwardly to the off position, the movement of the shoes being about the pins $h^1$, and the pins $b$ being advanced to permit this to take place. In this return movement the shoes are released from the brake drum. In thus maintaining the disc $a$ in the partially rotated position the pins $b$ and the brake shoes are caused to take up positions nearer to the brake drum than what would have been the case had no movement of the pins been effected and consequently, the brake blocks $d^1$ of the shoes $d$ will be in advanced positions capable of being rendered more quickly effective than would otherwise have been the case, whilst the hand or foot operated brake lever will be returned to its initial position. The pawls $a^2$ engaging the disc $a$ are spring controlled and mounted on a plate $k$ in which is also mounted the spindle $a^1$ of the disc $a$ and the spindle of the cam $f$, while the shaft $l$ to be braked extends through the plate $k$ and between the arms of the bifurcated rod $h^2$ and is fitted with a drum (not shown) for the engagement of the brake blocks $d^1$ therewith.

In the arrangement shown in Figure 2, the ratchet and bifurcated rods are dispensed with and the link $f^2$ is provided with an extension $f^3$ pivotally connected to a lever $a^3$ having a spring controlled pawl $a^4$ pivotally mounted thereon and engaging the ratchet disc $a$. With the latter is also engaged the pawl $a^2$ which is similarly controlled and mounted on a stationary support. In the operation of this alternative arrangement the application of the brake causes the pawl $a^4$ to move over the ratchet disc $a$ and should the brake blocks $d^1$ have worn away sufficiently for the pawl $a^4$ to move a distance greater than the length of one tooth of the ratchet disc, the pawl $a^4$ is caused to engage with the adjacent tooth. Upon the release of the brake the ratchet disc $a$ is rotated by the return of the brake operating gear to its initial position and consequently the disc $a$ is moved relatively to the pawl $a^2$ and the pins $b$ of the brake shoes advanced accordingly through the medium of the plate $a^5$ which carries the pins $b$ and is mounted on the spindle $a^1$ attached to the ratchet disc $a$. In thus arranging the parts, the brake blocks are advanced towards the brake drum, having been automatically adjusted in the previous operation and release of the brake operating gear. With this form of construction it will be apparent that the brake is capable of being applied by moving the brake operating gear in the opposite direction. When this takes place the ratchet disc $a$ is rotated through the medium of the pawl $a^4$ during the application of the brake. Should it be necessary to rotate the ratchet disc $a$ to the extent of one or more teeth in moving the brake blocks into engagement with the brake drum, then such movement of the disc will be taken up by the pawl $a^2$ on a stationary part of the gear and upon the release of the brake operating gear the ratchet disc $a$ will be prevented from rotating in a reverse direction and the pawl $a^4$ will travel over the disc $a$ a distance corresponding with the take-up thereof.

This movement of the pawl $a^4$ is permitted by the spring controlling it, whereas it is held in engagement with the ratchet teeth when the lever $f^1$ is moved anti-clockwise, it not being possible to disengage the pawl $a^4$ from the teeth of the ratchet wheel $a$ in this movement. During the movement of the pawl $a^4$ relatively to the ratchet wheel $a$, which is permitted by the spring controlling the pawl when the lever is moved in a clockwise direction, the ratchet wheel $a$ is held against rotary movement by the ratchet rod $h$ and the pawl $j$ engaging therewith.

The alternative geared arrangement shown in Figures 3 and 4 comprises a partially toothed wheel $o$ between and engaging with toothed sector plates $p$ and $p^1$ which are respectively mounted on the cam spindle and the spindle $a^1$ of the ratchet disc $a$, the plate $p^1$ being free to rotate in one direction relatively to the ratchet disc $a$ and the latter being caused to rotate with the sector plate $p^1$ through the spring controlled pawl $a^4$ pivotally mounted thereon when the sector plate $p^1$ is rotated in the opposite direction. In the event of the sector plate $p^1$ and the ratchet disc $a$ being rotated an angular distance greater than the angular pitch of the ratchet teeth of the disc $a$, the latter is advanced a corresponding angular distance when the brake is released thus advancing the brake shoes towards the brake drum through the pins $b$ provided on the ratchet disc $a$. When the brake is applied by moving the cam $f$, the movement is transmitted through the wheel $o$ and sector plates $p$ and $p^1$ to the pawl $a^4$ which is caused to move relatively to the disc $a$. Should the movement be sufficient for the pawl $a^4$ to move the distance of a tooth on the disc $a$ (representing wear of the brake blocks), the pawl $a^4$ will rotate the disc $a$ to the extent of one tooth which will accordingly be taken up by the pawl $a^2$. Only a limited number of teeth are provided on the ratchet disc $a$ so that when the brake blocks are practically worn away the automatic adjustment stops and the hand or foot operated lever moves past the point where the adjustment would otherwise take place, thus indicating to the driver of the vehicle that new brake blocks are required. The wheel $o$ and sector plates $p$ and $p^1$ are mounted between plates $q$ which form a part of the casing of the gear and on one of such plates is mounted the pawl $a^2$.

In the combined arrangement of double brake shown in Figure 5, an adjusting disc and a cam are provided on each side of shaft $l$ to be braked, the spindle $f^{10}$ of the cam $f^{11}$ serving to support the hollow spindle $a^{10}$ of the disc $a^{11}$ on one side of the shaft $l$ and the spindle $a^{12}$ of the disc $a^{13}$ passing through the hollow spindle $f^{12}$ carrying the cam $f^{13}$ on the opposite side of the said shaft. The spindle $f^{10}$ of the cam $f^{11}$ and the spindle $a^{12}$ of the disc $a^{13}$ are attached as shown in Figure 2 by levers to a link connected with the brake operating lever, while the cam $f^{13}$ and its hollow spindle $f^{12}$ are attached by a lever to a link connected to the brake operating lever as described with reference to Figure 1, and are also geared with the disc $a^{11}$ and the hollow spindle $a^{10}$ by gearing such as shown in Figures 3 and 4, the gearing comprising the toothed sector plates $p$ and $p^1$ and the intermediate toothed wheel $o$, the former being keyed to their respective hollow spindles and the latter being rotatably mounted on the boss $q^1$ of the gear frame $q^2$, while through the boss $q^1$ extends the said shaft $l$. Each of the discs $a^{11}$ and $a^{13}$ are provided with ratchet teeth which are engaged by spring controlled pawls $a^2$ respectively mounted on the toothed sector plate $p$ and an extension $q^3$ of the gear frame $q^2$. The brake shoes $d$ of each braking mechanism are connected by the springs $g$ as described with reference to Figures 1 and 2, and the whole of the combined arrangement is enclosed within the brake drum $d^2$, the latter being attached to the shaft $l$ and supported on a continuation $q^4$ of the boss $q^1$ of the gear farme $q^2$, the supporting of the brake drum on the said continuation being effected through ball bearings $n$.

In the construction shown in Figure 6 the adjustment of the discs $a^5$ carrying the brake shoe pins $b$ is effected through the medium of worm and worm wheel gearing from the ratchet disc $a$, the latter being rotated by the spring controlled pawl $a^4$ pivotally mounted on the lever $r$ connected by a link $s$ to the lever $f^1$ attached to the brake operating cam $f$. In this construction the pawl $a^4$ is moved relatively to the disc $a$ when the brake is applied. Should the lever $f^1$ be moved sufficiently in the application of the brake to move the pawl $a^4$ a distance equal to the length of one of the teeth of the ratchet disc $a$ the pawl $a^4$ will be advanced to the extent of one tooth. Upon the release of the brake by returning the lever $f^1$ to its original position, the disc $a$ will be rotated the extent of one tooth and impart a corresponding movement to the worm wheels $t$ and $t^1$ which in turn will similarly rotate the worm spindle $t^2$ and partially rotate the disc $a^6$ through the medium of the teeth thereon. Hence the pins $b$ will be adjusted to take up the wear of the brake blocks.

The arrangement shown in Figures 7 and 8 is similar to that described with reference to Figure 2, and also includes the brake drum $d^2$ and a means for permitting the link $f^2$ to be moved relatively to the lever $f^1$ during the application of the brakes. Such means comprises a block $f^4$ to which the lever $f^1$ is pivotally connected and a slot $f^5$ in the link $f^2$, the block $f^4$ being disposed in the slot $f^5$ and controlled by a spring $f^6$. The arrangement of the spring $f^6$ in the slot $f^5$ enables slight differences between a series of brakes to be taken up and ensures the full application of all the brakes which would under some circumstances not be fully obtainable solely with the ratchet disc arrangement and, especially where the brake blocks have worn to an extent insufficient for taking up a ratchet tooth by the fixed pawl in a previous application of the brakes. The position of the spring $f^6$ shown in Figures 7 and 8 is that in which the take up of the ratchet disc $a$ by the pawl $a^2$ is effected during the release of the brake. Should the take up be made during the application of the brake then the spring and slot would be disposed on the opposite side of the lever $f^1$. In the Figures 7 and 8 is also shown the means for applying and releasing the brakes, such means comprising the link $f^2$ pivotally connected to a lever $u$ which is mounted on a shaft $u^1$ carried in a part of the frame $v$ of the vehicle. On the shaft is also mounted a brake lever $u^2$. To the frame $v$ is attached a curved rack $w$ with which is capable of engaging a toothed block $w^1$. The block is attached to a rod $w^2$ provided on the brake lever $u^2$ and is controlled by a spring $w^3$ disposed in a slot $u^3$ formed in the lever $u^2$. The rod $w^2$ projects from the upper end of the lever $u^2$ and is provided with an enlarged part $w^4$ to facilitate its operation when releasing the toothed block $w^1$ from the rack $w$.

In the application of the invention to driving clutches shown in Figures 9 and 10, the clutch shoes $d$ fitted with clutch blocks $d^1$ are disposed within the clutch drum $d^3$ which is mounted on the shaft $x$ and adapted to be driven through the clutch blocks $d^1$ when these are moved into engagement therewith by the operation of the lever $y$ and the block $y^1$ which is rotatable relatively to the lever and is adapted to be moved thereby to and from the clutch drum. Links $y^2$ are connected at one end to the block $y^1$ and at the other end are connected with means for imparting rotary movement to spindles provided with right and left hand screw-threaded portions $y^3$ and $y^4$ arranged in engagement with correspondingly threaded nuts or blocks $y^5$ pivotally connected by pins $y^6$ to the clutch shoes $d$. Rotary motion is imparted to the spindles by the movement of the block to and from the clutch drum, and in thus being rotated the clutch blocks $d^1$ are moved towards and away from the inner surface of the periphery of the clutch drum $d^3$ through the medium of the pins $y^6$ and threaded blocks $y^5$ with which the spindles engage. The pivot pins $y^6$ of the threaded blocks enable the latter to move relatively to the clutch shoes $d$ and avoid strain on the engaging screw-threaded parts. The means for imparting rotary movement to the spindles comprise on one side a disc $y^7$ which is attached to one of the spindles and to one of the links $y^2$, and on the other side, a ratchet disc $a$ attached to the other spindle and a spring controlled pawl $a^4$ engaging with the ratchet disc and pivotally mounted on a plate $p^2$ free to rotate on the spindle fitted with the ratchet disc $a$. To the plate $p^2$ is attached the other link $y^2$. The ratchet disc $a$ and the pawl $a^4$ on the plate $p^2$ are provided for taking up wear which occurs to the clutch blocks $d^1$ in a manner similar to that previously explained. To this end a second spring controlled pawl $a^2$ is mounted on one of the blocks $y^5$ and arranged in engagement with the ratchet disc $a$. In the event of it being necessary to move the rotatable block $y^1$ a distance greater than that required to rotate the ratchet disc $a$ an angular distance of one tooth, this excess movement is taken up by the pawl $a^2$ by reason of its passing out of engagement with the tooth with which it engages and gearing with a succeeding tooth. Upon the reverse movement of the clutch operating mechanism the ratchet disc is prevented from returning to its original position by the pawl $a^2$ and only the plate $p^2$ is free to return with the pawl $a^4$ with the link $y^2$. Thus the clutch operating mechanism is adapted to adjust itself in taking up wear of the blocks $d^1$ and the lever whereby the mechanism is operated is free to be returned to its normal position. The clutch shoes $d$ are connected to each other by springs $g$ as hereinbefore described and the connection of the driving shaft with the shoes is effected through the medium of the coupling arms $z$ which are provided with pins $z^1$ engaging slots $z^2$ in the clutch shoes $d$.

From the foregoing it will be seen that besides the advantages already referred to herein there is the further advantage that the whole of each brake or clutch shoe is advanced towards the brake or clutch drum in the application of the brake or engagement of the clutch and consequently even wear of the blocks is maintained, this being due to the pivoted or equivalent ends of the shoes being moved as well as the cam operated or equivalent ends.

What I claim and desire to secure by Letters Patent of the United States is:—

1. A brake and clutch gear comprising, a rotatable drum, a rotatable element, members movable relatively to the drum, means connecting one end of each member with parts on the element eccentric to the centre thereof, means for rotating the element in one direction, means for preventing rotation of the element in the opposite direction, a control means for moving the members into and out of engagement with the drum, and means permitting relative movement between the control means and the means for rotating the element.

2. A brake and clutch gear comprising, a rotatable drum, a rotatable disc provided with eccentrically arranged pins, members pivotally mounted at one end on the said pins and movable relatively to the drum, means for rotating the disc in one direction, means preventing the rotation of the disc in the opposite direction, a control means for moving the members into and out of engagement with the drum, and means permitting relative movement between the control means and the means for rotating the disc.

3. A brake and clutch gear comprising, a rotatable drum, a rotatable disc provided with pins eccentrically disposed thereon, teeth arranged in connection with the said disc, members movable relatively to the drum and mounted at one end on the said pins, means for rotating the disc in one direction, means engaging with the said teeth for preventing rotation of the disc in the opposite direction, a control means for moving the members into and out of engagement with the drum, and means permitting relative movement between the control means and the means for rotating the disc.

4. A brake and clutch gear comprising, a rotatable drum, a rotatable disc with pins eccentrically arranged thereon, a ratchet tooth disc connected with the rotatable disc, members pivotally connected at one end to the pins on the rotatable disc and movable relatively to the drum, a lever and pawl mechanism engaging the ratchet tooth disc for rotating the discs in one direction, a stationary pawl engaging the ratchet tooth disc for preventing the rotation of the discs in the opposite direction, a cam for moving the members into engagement with the drum, a spring for disengaging the members from the drum, a control lever for operating the cam and the lever and pawl mechanism, and means permitting relative movement between the control lever and the lever and pawl mechanism.

5. A brake and clutch gear comprising, a rotatable drum, a rotatable disc with pins eccentrically arranged thereon, a ratchet tooth disc connected with the rotatable disc, members pivotally connected at one end to the pins on the rotatable disc and movable relatively to the drum, a lever and pawl mechanism engaging the ratchet tooth disc for rotating the disc in one direction, a stationary pawl engaging the ratchet tooth disc for preventing the rotation of the discs in the opposite direction, a cam for moving the members into engagement with the drum, a spring for disengaging the members from the drum, an arm connected to the cam, a control lever, a link formed with a slot for receiving the free end of the arm and connecting the control lever to the lever and pawl mechanism, and a spring between one end of the slot and the arm for permitting relative movement between the link and the arm.

GEORGE HENRY ENDERBY.